US012793993B2

(12) United States Patent
MacDonald

(10) Patent No.: US 12,793,993 B2
(45) **Date of Patent: *Nov. 10, 2026**

(54) SYSTEMS FOR COOLING EMERGENCY POWER UNITS

(71) Applicant: Hamilton Sundstrand Corporation, Charlotte, NC (US)

(72) Inventor: Malcolm P. MacDonald, Bloomfield, CT (US)

(73) Assignee: Hamilton Sundstrand Corporation, Charlotte, NC (US)

(*) Notice: Subject to any disclaimer, the term of this patent is extended or adjusted under 35 U.S.C. 154(b) by 840 days.

This patent is subject to a terminal disclaimer.

(21) Appl. No.: 18/102,488

(22) Filed: Jan. 27, 2023

(65) Prior Publication Data

US 2024/0258534 A1 Aug. 1, 2024

(51) Int. Cl.

| | |
|---|---|
| ***H01M 8/04029*** | (2016.01) |
| ***B60L 50/70*** | (2019.01) |
| ***B60L 58/32*** | (2019.01) |
| ***B64D 27/33*** | (2024.01) |
| ***B64D 27/355*** | (2024.01) |
| ***B64D 33/08*** | (2006.01) |
| ***H01M 8/04007*** | (2016.01) |

(52) U.S. Cl.

CPC ......... *H01M 8/04029* (2013.01); *B60L 50/70* (2019.02); *B60L 58/32* (2019.02); *B64D 27/33* (2024.01); *B64D 27/355* (2024.01); *B64D 33/08* (2013.01); *H01M 8/04059* (2013.01); *H01M 8/04067* (2013.01); *B60L 2200/10* (2013.01); *H01M 2250/20* (2013.01)

(58) Field of Classification Search

CPC ......... H01M 8/04029; H01M 8/04059; H01M 8/04067; B60L 50/70; B60L 58/32; B64D 27/33; B64D 27/355; B64D 33/08

See application file for complete search history.

(56) References Cited

U.S. PATENT DOCUMENTS

| | | | | |
|---|---|---|---|---|
| 7,546,981 | B2 | 6/2009 | Hoffjann et al. | |
| 9,472,819 | B2 | 10/2016 | Riordan et al. | |
| 10,794,617 | B2 | 10/2020 | Moxon | |
| 11,434,019 | B2 | 9/2022 | Law | |
| 2003/0044663 | A1* | 3/2003 | Ballantine ......... | H01M 8/04067 429/416 |
| 2004/0043276 | A1* | 3/2004 | Hoffjann ............. | H01M 8/0612 429/411 |

(Continued)

FOREIGN PATENT DOCUMENTS

| | | | |
|---|---|---|---|
| DE | 102009050309 | * | 4/2011 |
| DE | 102009050309 | A1 | 4/2011 |

(Continued)

OTHER PUBLICATIONS

English translation of DE Publication 102009050309, Apr. 2011.*
European Search Report dated Apr. 11, 2025 in connection with European Patent Application No. 24154274.5, 10 pages.

*Primary Examiner* — Brittany L Raymond

(57) ABSTRACT

In accordance with at least one aspect of this disclosure, an emergency power unit for an aircraft includes, a fuel cell system configured to generate power using a fuel and an oxidant. A thermal management system is in thermal communication with the fuel cell system to divert heat from the fuel cell system to the thermal management system.

20 Claims, 4 Drawing Sheets

(56) References Cited

U.S. PATENT DOCUMENTS

| | | | | |
|---|---|---|---|---|
| 2012/0248252 | A1 * | 10/2012 | Al-Ali .................... | B64D 41/00<br>244/135 R |
| 2016/0036071 | A1 | 2/2016 | Klewer et al. | |
| 2016/0244172 | A1 * | 8/2016 | Gibbons ................ | B64D 13/06 |

FOREIGN PATENT DOCUMENTS

| | | | |
|---|---|---|---|
| EP | 3866235 | A1 | 8/2021 |
| EP | 3950509 | A1 | 2/2022 |

* cited by examiner

SYSTEMS FOR COOLING EMERGENCY POWER UNITS

TECHNICAL FIELD

The present disclosure relates to cooling systems, and more particularly to cooling emergency power units (e.g., for aircraft).

BACKGROUND

Typical emergency power units use a ram air turbine to generate power in an emergency as well as use ram air as a coolant in one or more applications. A fuel cell can be used as an emergency power unit, but the operating temperature needs to be managed to function properly. Traditional thermal management systems for fuel cells can be physically large, can be heavy, and/or can induce a drag on the aircraft.

There is always a need in the art for improvements to emergency power units in the aerospace industry, and in particular, cooling systems for said emergency power units. This disclosure provides a solution for this need.

SUMMARY

In accordance with at least one aspect of this disclosure, an emergency power unit for an aircraft includes, a fuel cell system configured to generate power using a fuel and an oxidant. The fuel cell system can include a fuel cell connected in fluid communication to receive the fuel and the oxidant, a compressor configured to receive the oxidant and compress the oxidant upstream of the fuel cell, and a turbine downstream from the fuel cell to receive exhaust flow and operatively connected to the compressor to turn the compressor. The fuel cell system can further include a fuel supply system fluidly connected to the fuel cell system to supply the fuel to the fuel cell system and an oxidant supply system fluidly connected to the fuel cell system to supply the oxidant to the fuel cell system. A thermal management system is in thermal communication with the fuel cell system to divert heat from the fuel cell system to the thermal management system. The thermal management system includes, a heat exchanger disposed in a coolant flow path configured to receive a coolant from a coolant supply to exchange heat between the fuel cell system and the coolant in the coolant flow path.

In certain embodiments, the coolant can be an expendable coolant. The coolant supply can include an expendable coolant tank at an inlet of the coolant flow path to provide the expendable coolant directly to the heat exchanger via the coolant flow path. In certain embodiments, the heat exchanger can be disposed in the fuel cell. In certain embodiments, the coolant can be pumped into the fuel cell via the coolant flow path. In certain embodiments, the coolant can be wicked into the fuel cell. In certain embodiments, the heat exchanger can include a cold plate. The cold plate can have a channel defined therein, the channel extending between an inlet and an outlet for passing the coolant from coolant flow path through the cold plate. In certain embodiments, no other heat exchangers are disposed in the coolant flow path.

In certain embodiments the expendable coolant can include a phase change fluid configured to change from a liquid phase to vapor phase upon thermal communication with the heat from the fuel cell system to cool the fuel cell system near isothermally. An outlet of the first coolant flow path can be configured to expel the vapor phase of the expendable coolant to ambient. In certain embodiments, the phase change fluid can include one of: water, ethanol, methanol, propane, ammonia, or carbon dioxide. In certain embodiments, the phase change fluid can be free of ram air.

In accordance with at least one aspect of this disclosure, an emergency power unit for an aircraft can include, a fuel cell system configured to generate power using a fuel and an oxidant, the fuel cell system. The fuel cell system can include, a fuel cell fluidly connected to receive the fuel and the oxidant, a compressor configured to receive the oxidant and compress the oxidant upstream of the fuel cell, and a turbine downstream from the fuel cell to receive exhaust flow and operatively connected to the compressor to turn the compressor.

The emergency power unit can also include a fuel supply system fluidly connected to the fuel cell system to supply the fuel to the fuel cell system, and an oxidant supply system fluidly connected to the fuel cell system to supply the oxidant to the fuel cell system.

A thermal management system can be in thermal communication with the fuel cell system to divert heat from the fuel cell system to the thermal management system. In certain embodiments, the thermal management system can include a heat exchanger disposed in a coolant loop configured to receive a coolant from a coolant supply through the heat exchanger to exchange heat between the fuel cell system and the coolant in the coolant loop, wherein the coolant supply includes a coolant tank to provide the coolant directly to the heat exchanger via the coolant loop.

In certain embodiments, the heat exchanger can be the only heat exchanger in the coolant loop. In certain embodiments, the coolant tank can include a fuel tank and the coolant can include a fuel. In certain embodiments, the coolant tank can include a greywater tank and the coolant can include greywater.

In accordance with at least one aspect of this disclosure, an emergency power unit for an aircraft can include, a fuel cell system configured to generate power using a fuel and an oxidant, the fuel cell system. The fuel cell system can include, a fuel cell fluidly connected to receive the fuel and the oxidant, a compressor configured to receive the oxidant and compress the oxidant upstream of the fuel cell, and a turbine downstream from the fuel cell to receive exhaust flow and operatively connected to the compressor to turn the compressor.

The emergency power unit can also include a fuel supply system fluidly connected to the fuel cell system to supply the fuel to the fuel cell system, and an oxidant supply system fluidly connected to the fuel cell system to supply the oxidant to the fuel cell system.

A thermal management system can be in thermal communication with the fuel cell system to divert heat from the fuel cell system to the thermal management system. In certain embodiments, the thermal management system can include a first heat exchanger disposed in a first coolant flow path configured to receive a first coolant from a first coolant supply through the first heat exchanger to exchange heat between the fuel cell system and the first coolant in the first coolant flow path. The thermal management system can include a second heat exchanger disposed in the first coolant flow path to receive the first coolant from the first coolant flow path, and disposed in a second coolant flow path fluidly isolated from the first coolant flow path, configured to receive a second coolant from a second coolant supply through the second heat exchanger to exchange heat between the first coolant and the second coolant.

In certain embodiments, the first heat exchanger can include a cold plate having an inlet and an outlet configured to pass the first coolant through the cold plate. The second heat exchanger can include a multi-fluid heat exchanger having a first inlet and a first outlet configured to pass the first coolant through the multi-fluid heat exchanger and a second inlet and a second outlet configured to pass the second coolant through the multi-fluid heat exchanger in thermal communication with the first coolant and in fluid isolation from the first coolant.

In certain embodiments, the first coolant supply can include a refrigerant tank and the first coolant can include a refrigerant. The second coolant supply can include a pressurized air source and the second coolant can include pressurized air. In certain such embodiments, the first coolant flow path can be a coolant loop, wherein an outlet of the second coolant flow path can be configured to exhaust the pressurized air to ambient. In embodiments, the pressurized air source can be a cabin air compressor and the second coolant can include pressurized cabin air.

In embodiments, the first coolant flow path can be a coolant loop and the second coolant flow path can be a coolant loop. In embodiments, the first coolant supply can include a refrigerant tank and the first coolant can include refrigerant. In certain embodiments, the second coolant supply can include a greywater tank and the coolant can include greywater. In certain embodiments, the second coolant supply can include a fuel tank and the coolant can include fuel.

These and other features of the embodiments of the subject disclosure will become more readily apparent to those skilled in the art from the following detailed description taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, embodiments thereof will be described in detail herein below with reference to certain figures, wherein.

DETAILED DESCRIPTION

Figure 1:
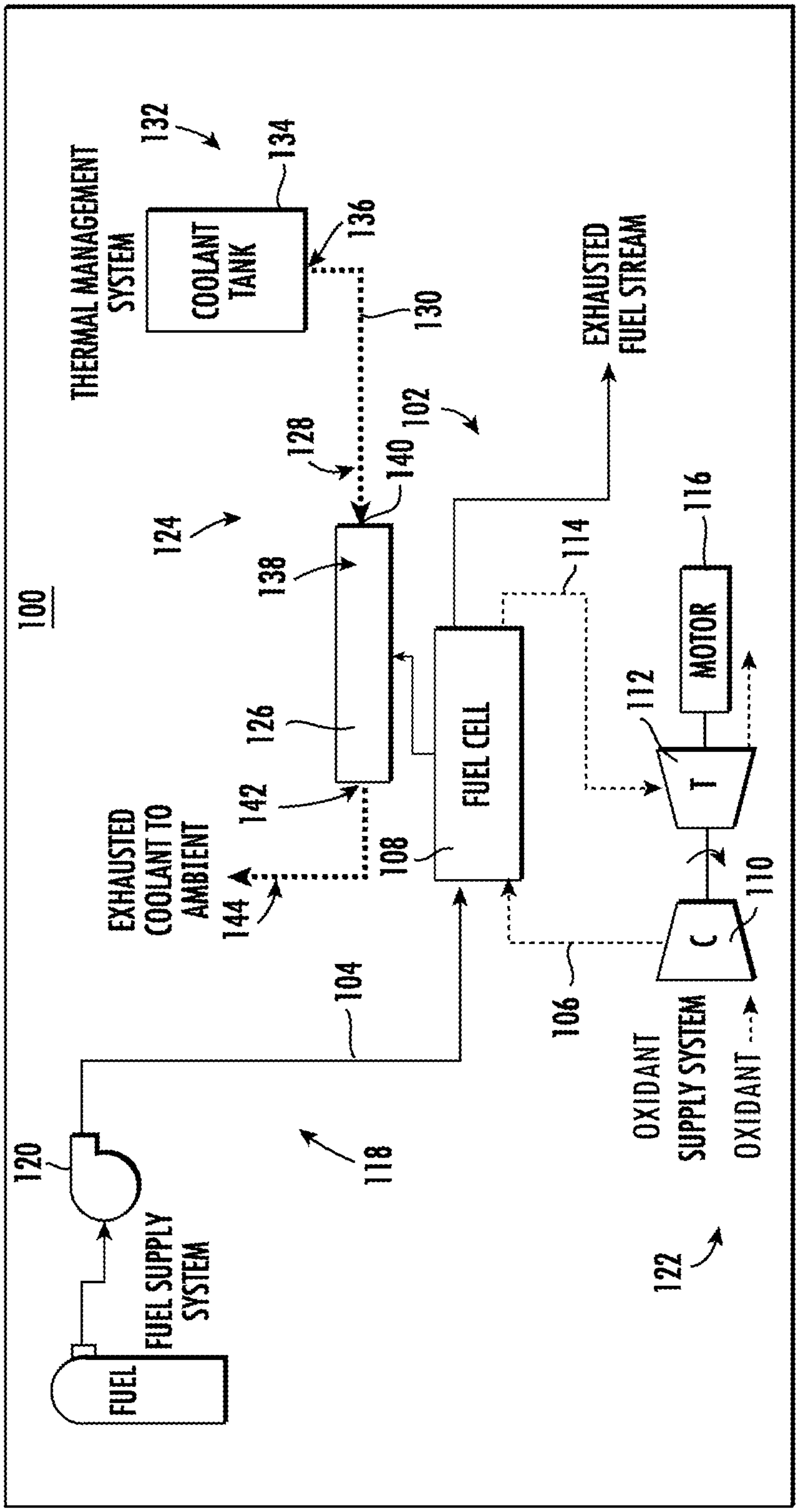
FIG. 1 is a schematic diagram of an emergency power unit in accordance with this disclosure, showing an embodiment of a thermal management system.
Figure 2:
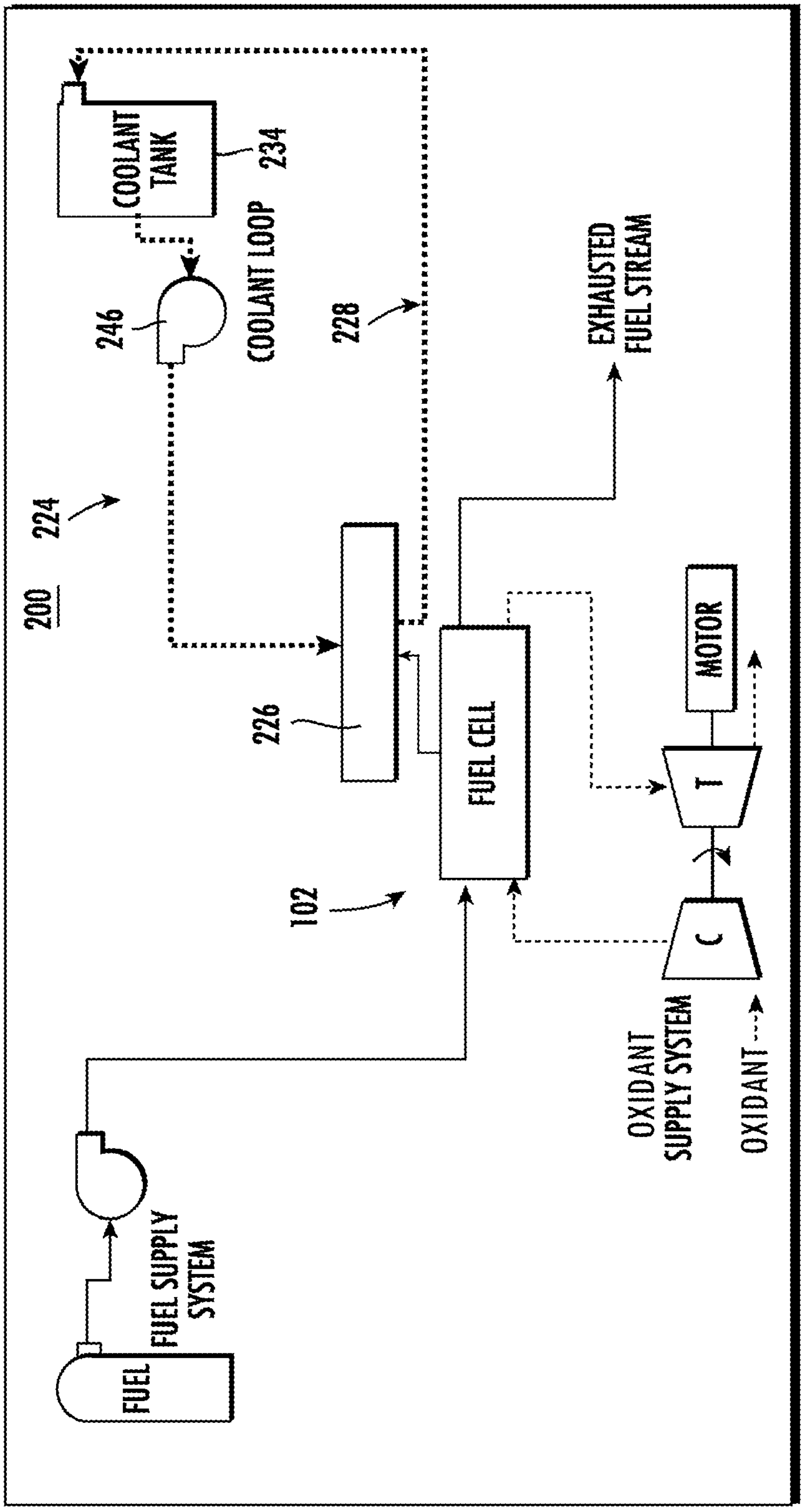
FIG. 2 is a schematic diagram of an emergency power unit in accordance with this disclosure, showing another embodiment of a thermal management system.
Figure 3:
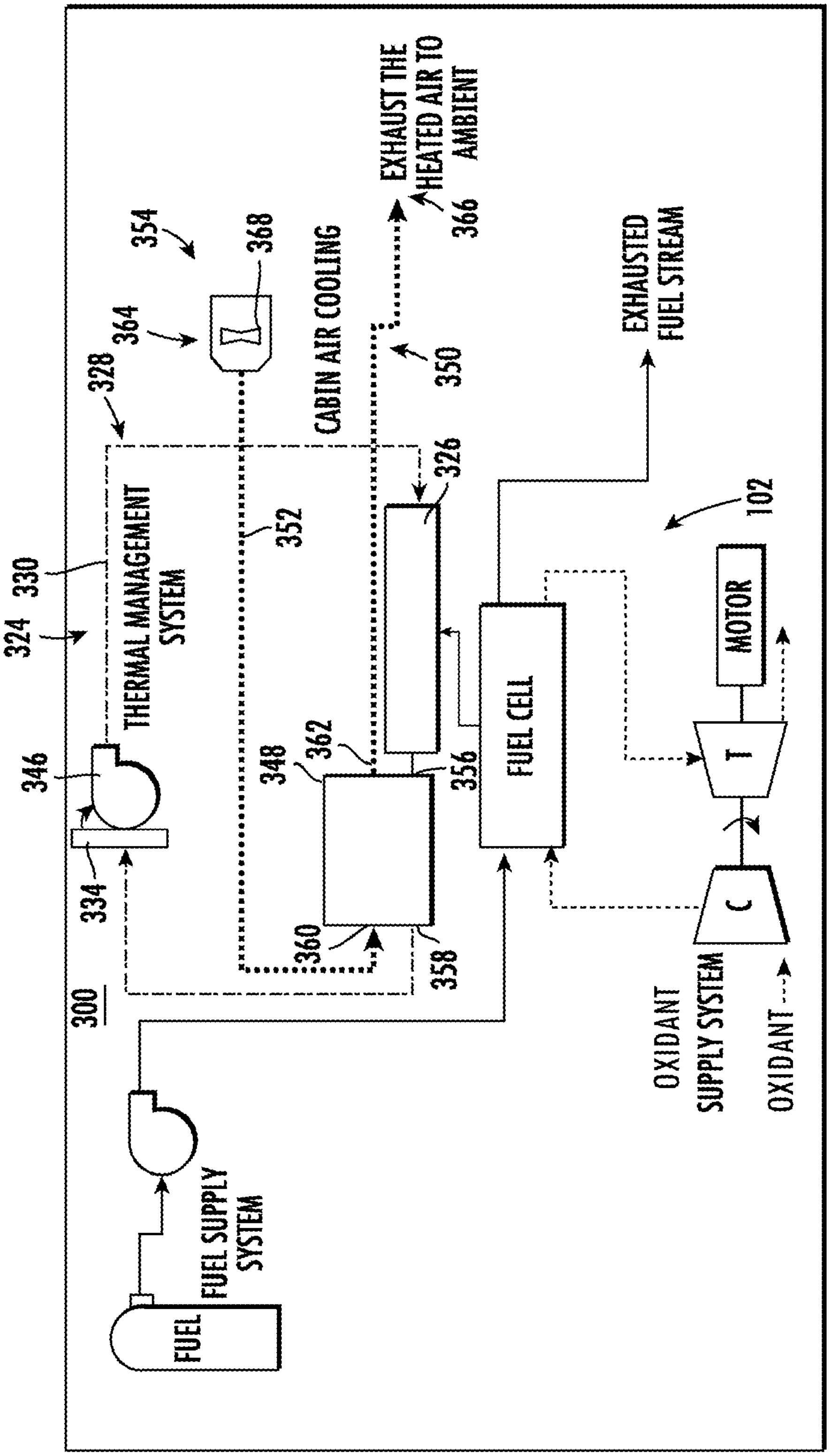
FIG. 3 is a schematic diagram of an emergency power unit in accordance with this disclosure, showing another embodiment of a thermal management system.
Figure 4:
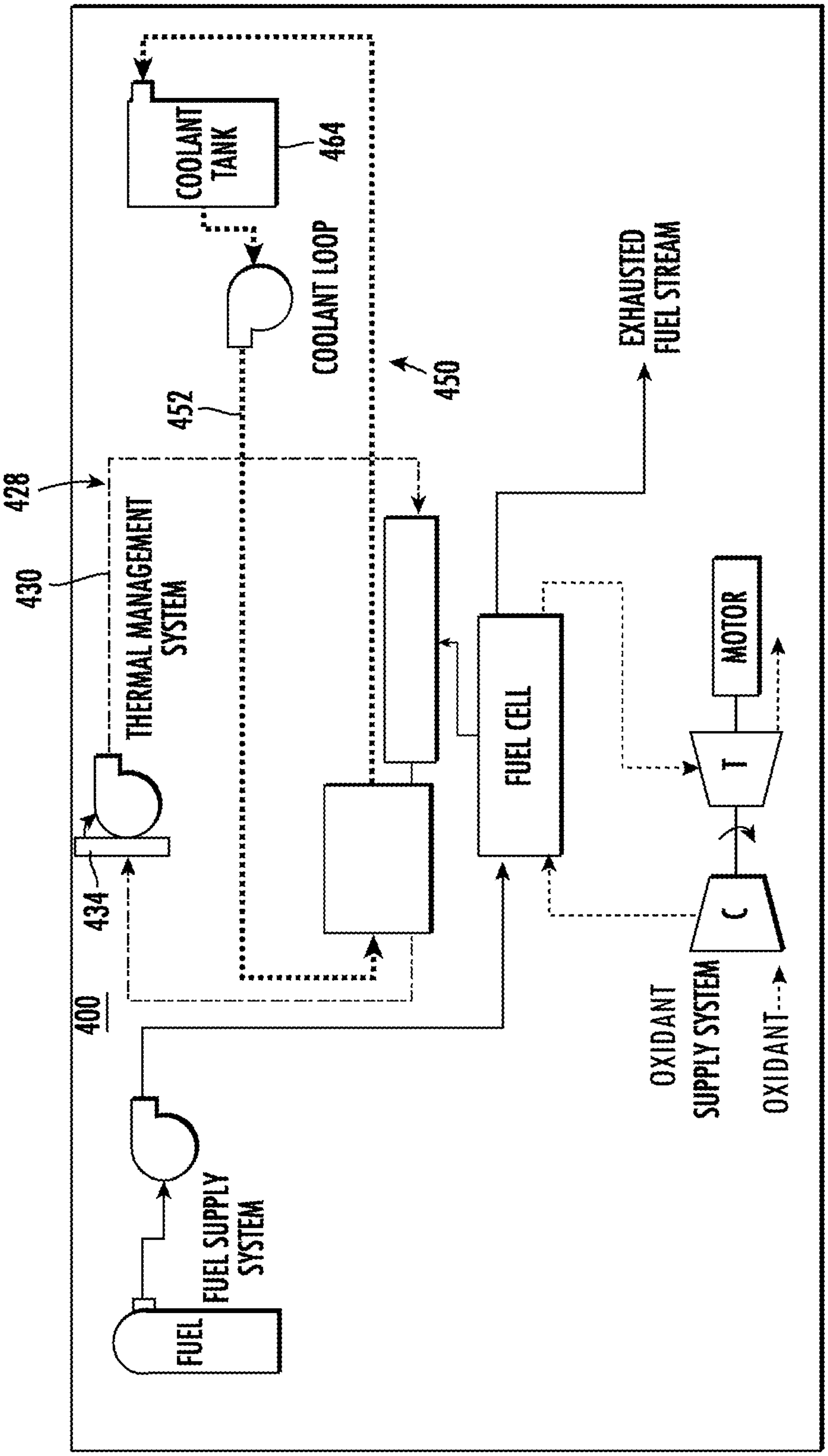
FIG. 4 is a schematic diagram of another emergency power unit in accordance with this disclosure, showing an embodiment of a thermal management system.

Reference will now be made to the drawings wherein like reference numerals identify similar structural features or aspects of the subject disclosure. For purposes of explanation and illustration, and not limitation, an illustrative view of an embodiment of a system (e.g., an emergency power unit) in accordance with the disclosure is shown in FIG. 1 and is designated generally by reference character 100. Other embodiments and/or aspects of this disclosure are shown in FIGS. 2-4.

In accordance with at least one aspect of this disclosure, as shown in FIGS. 1-4, an emergency power unit 100 for an aircraft can include, a fuel cell system 102 configured to generate power using a fuel 104 and an oxidant 106. The fuel cell system can include a fuel cell 108 connected in fluid communication to receive the fuel 104 and the oxidant 106, a compressor 110 configured to receive the oxidant 106 and compress the oxidant upstream of the fuel cell 108, and a turbine downstream 112 from the fuel cell 108 to receive exhaust flow 114 and operatively connected to the compressor 110 to turn the compressor 110. In embodiments, an electrical machine 116 (e.g., as starter motor) can be operatively connected to the turbine 112 to drive the turbine 112 while the compressor 110 spools up.

The fuel cell system can further include a fuel supply system 118 fluidly connected to the fuel cell system 102 to supply the fuel 104 to the fuel cell system 102 (e.g., using a pump 120) and an oxidant supply system 122 fluidly connected to the fuel cell system 102 to supply the oxidant 106 to the fuel cell system 102. A thermal management system 124 can be in thermal communication with the fuel cell system 102 to divert heat from the fuel cell system 102 to the thermal management system 124, and in certain embodiments, ultimately to ambient.

In certain embodiments, e.g., as shown in FIG. 1, the thermal management system 124 can include a heat exchanger 126 disposed in a coolant flow path 128 configured to receive a coolant 130 from a coolant supply 132 to exchange heat between the fuel cell system 102 and the coolant 130 in the coolant flow path 128. In embodiments the coolant 130 can be an expendable coolant. The coolant supply 132 can include an expendable coolant tank 134 at an inlet 136 of the coolant flow path 128 to provide the expendable coolant 130 directly to the heat exchanger 126 via the coolant flow path 128. In certain embodiments, the heat exchanger 126 can be disposed in the fuel cell 108 or the heat exchanger 126 can be in direct contact with the fuel cell 108. In certain embodiments, the coolant 130 can be pumped into the fuel cell 108 via the coolant flow path. In certain embodiments, the coolant 130 can be wicked into the fuel cell 108.

In certain embodiments, the heat exchanger 126 can include a cold plate. The cold plate 126 can have a channel 138 defined therein, the channel extending between an inlet 140 and an outlet 142 for passing the coolant 130 from coolant flow path 128 through the cold plate 126. In certain embodiments, no other heat exchangers are disposed in the coolant flow path 128, for example, the thermal management system 124 does not include, or additionally include, a ram air cooled heat exchanger.

In certain embodiments, the expendable coolant 130 can include a phase change fluid configured to change from a liquid phase to vapor phase upon thermal communication with the heat from the fuel cell system 102 to cool the fuel cell system near isothermally. An outlet 144 of the first coolant flow path can be configured to expel the vapor phase of the expendable coolant 130 to ambient. In certain embodiments, the phase change fluid can include one of: water, ethanol, methanol, propane, ammonia, or carbon dioxide. In certain embodiments, the phase change fluid can be free of ram air.

Embodiments of the thermal management system 124 can eliminate ram drag and can dramatically reduce the size of the heat exchanger (e.g., the cold plate) used in the thermal management system. As shown, in embodiments, the thermal management system 124 can provide cooling to the fuel cell system 102 by directly coupling the heat exchanger (e.g., the cold plate to an expendable coolant tank. The coolant tank can supply a phase change fluid to the fuel cell, either pumped or passively wicked into the fuel cell. When inside the heat exchanger, the phase change fluid is heated by the fuel cell and the fluid would change phase from liquid to vapor, thus cooling the fuel cell near-isothermally. The coolant vapor produced can then be rejected to the ambient air outside the aircraft.

Embodiments of the thermal management system 124 can eliminate bulky and heavy heat exchangers sized for the air-side requirements at low pressure, requiring large volume and associated mass. Embodiments can also eliminate ram air drag of the thermal management system, for example by removing the need for ram air cooling which is typically provided by ram air duct.

With reference now to FIG. 2, another embodiment of an emergency power unit 200 is shown. The emergency power unit 200 can be similar to that of the emergency power unit 100, for example emergency power unit 200 can have similar components and features with respect to emergency power unit 100. For brevity, the description of common elements that have been described above for emergency power unit 100 are not repeated with respect to emergency power unit 200 as shown in FIG. 2

As shown, the thermal management system 224 can include a heat exchanger 226 disposed in a coolant loop 228 configured to receive a coolant 230 from a coolant supply through the heat exchanger 226 to exchange heat between the fuel cell system 102 and the coolant 230 in the coolant loop 228. The coolant loop can include a recirculation pump 246 to circulate the coolant 230 through the coolant loop 228.

The coolant supply can include a coolant tank 234 to provide the coolant 230 directly to the heat exchanger 226 via the coolant loop 228. In certain embodiments, e.g., as shown, the heat exchanger 226 can be the only heat exchanger in the coolant loop 228. In certain embodiments, the coolant tank 234 can include a fuel tank and the coolant 230 can include a fuel (e.g., aircraft fuel). In certain embodiments, the coolant tank 234 can include a greywater tank and the coolant 230 can include greywater. Here, the greywater tank can be an existing aircraft greywater tank wherein the thermal management system is configured to pull greywater directly from the existing aircraft greywater system, for example separate from a dedicated fuel cell greywater tank or system. In certain embodiments, the emergency power unit system 200 may have no dedicated fuel cell greywater system and may be connected only to the aircraft greywater system.

Embodiments of the thermal management system 224 can utilize onboard greywater or onboard fuel flow to cool the fuel cell system 102 and eliminate the need for ram air cooling systems and associated heat exchangers. In embodiments, the thermal management system can directly couple the greywater source or fuel flow path with a heat exchanger in the thermal management system (e.g., the cold plate).

Embodiments can eliminate a refrigerant/air heat exchanger and replace it with a single heat exchanger having at least one highly thermally conductive fluid therein (e.g., greywater or fuel). Embodiments of the thermal management system 224 can cool the fuel cell by directly integrating the greywater into the fuel cell cold plate but not interacting with any active elements of the fuel cell. Embodiments can provide a reduced volume and weight of the thermal management system components (e.g., greater than 50% reduction in heat exchanger volume and mass). In embodiments using fuel as coolant, the onboard fuel tanks can include an amount of fuel having a sufficient reserve fuel in the fuel tanks to always act as a coolant in the event of an emergency power unit deployment.

With reference now to FIGS. 3 and 4, another embodiment of an emergency power unit 300, 400 is shown. The emergency power unit 300, 400 can be similar to that of the emergency power unit 100, 200, for example emergency power unit 300, 400 can have similar components and features with respect to emergency power unit 200. For brevity, the description of common elements that have been described above for emergency power unit 100, 200 are not repeated with respect to emergency power unit 300, 400 as shown in FIGS. 3 and 4.

In certain embodiments, such as shown in FIGS. 3 and 4, the thermal management system 324 can include a first heat exchanger 326 disposed in a first coolant flow path 328 configured to receive a first coolant 330 from a first coolant supply 332 through the first heat exchanger 326 to exchange heat between the fuel cell system 102 and the first coolant 330 in the first coolant flow path 328. The thermal management system 324 can include a second heat exchanger 348 disposed in the first coolant flow path 328 downstream of the first heat exchanger 326 to receive the first coolant 330 from the first coolant flow path 328. The second heat exchanger 348 is disposed in a second coolant flow path 350 fluidly isolated from the first coolant flow path 328. The second heat exchanger 348 can be configured to receive a second coolant 352 from a second coolant supply 354 through the second heat exchanger 348 to exchange heat between the first coolant 330 and the second coolant 352.

The first heat exchanger 326 (e.g., similar to cold plate 126 described above). The second heat exchanger 348 can include a multi-fluid heat exchanger 348 having a first inlet 356 and a first outlet 358 configured to pass the first coolant 330 through a first internal channel of the multi-fluid heat exchanger 348. The multi-fluid heat exchanger 348 can have a second inlet 360 and a second outlet 362 configured to pass the second coolant 352 through a second internal channel of the multi-fluid heat exchanger in thermal communication with the first coolant 330 and in fluid isolation from the first coolant 330.

In certain embodiments, such as shown in FIG. 3, the first coolant supply can include a refrigerant tank 334 and the first coolant 330 can include a refrigerant (e.g., glycol). The second coolant supply can include a pressurized air source 364 and the second coolant 352 can include pressurized air. In certain such embodiments, the first coolant flow path 328 can be a coolant loop, and an outlet 366 of the second coolant flow path 350 can be configured to exhaust the pressurized air to ambient. In embodiments, the pressurized air source 364 can be a cabin air compressor 368 and the second coolant 352 can include pressurized cabin air. Embodiments utilizing a cabin air supply for the second coolant can reduce ram drag by using air that has already been compressed for cabin air purposes and using it to cool the heated refrigerant. Embodiments of the thermal management system 324 can reject the fuel cell heat directly to previously compressed air by sourcing the second coolant medium of air from the cabin air. Thus, in such embodiments, no ram air is required to perform fuel cell cooling, which can eliminate the ram air drag that may typically be included in a fuel cell thermal management system.

In certain embodiments, such as shown in FIG. 4, the first coolant flow path 428 can be a coolant loop and the second coolant flow path 450 can be a coolant loop. The first coolant supply can include a refrigerant tank 434 and the first coolant 430 can include refrigerant. In certain embodiments, the second coolant supply can include a coolant tank 464. The coolant tank 464 can include greywater tank and the coolant 452 can include greywater. In certain embodiments, the coolant tank 464 can include a fuel tank and the coolant 452 can include fuel.

Embodiments of the thermal management system 424 can utilize onboard grey water systems or onboard fuel systems to perform the fuel cell cooling by directly coupling the greywater or fuel flow with a heat exchanger in the existing coolant loop. Embodiments can replace a traditional refrigerant/air heat exchanger with a much smaller heat exchanger that performs cooling between two dense and highly conductive fluids (e.g., glycol and greywater or glycol and fuel). For embodiments utilizing onboard fuel flow, the fuel tanks should include sufficient reserve fuel in the fuel tanks to always act as a coolant in the event of an emergency power unit deployment, and the fuel cell temperature can be below 200 F throughout operation, which can mitigate coking within the fuel flow loop.

Embodiments of the thermal management systems 124, 224, 324, 424 can provide for reduced volume and weight of the thermal management system components as compared to traditional systems. Traditional thermal management systems can include a glycol/air heat exchangers, which are sized for the air-side requirements on low pressure drop. Accordingly, typical glycol/air heat exchangers in this application results in large volume and associated mass of these heat exchangers. Removing the glycol/air heat exchanger altogether as described with respect to thermal management systems 124, 224, or replacing the traditional glycol/air heat exchangers with the glycol/greywater or glycol/fuel heat exchangers as described with respect to thermal management system 424 can reduce overall system volume significantly, for example greater than 50%. The reduced volume can also reduce the mass of the heat exchangers by reducing the case volume. Moreover, replacing air with fuel or greywater as in system 424 will shrink the channel dimensions required to achieve a given heat transfer performance, thus reducing mass of the heat exchangers further.

Embodiments of thermal management systems provided herein allow for elimination of ram air drag of the thermal management system by rejecting the fuel cell heat directly to the coolant, so no ram air is required to perform fuel cell cooling. For embodiments of the thermal management systems utilizing onboard fuel (e.g., 224, 424) the fuel system can be sufficiently large compared to the thermal loads of the fuel cell, such that the temperature of the fuel supplied to the fuel cell for cooling during operation of the fuel cell is near-isothermal. In embodiments, using fuel as the coolant allows for the rejected fuel cell heat to preheat the fuel before the fuel is burned for combustion.

Those having ordinary skill in the art understand that any numerical values disclosed herein can be exact values or can be values within a range. Further, any terms of approximation (e.g., "about", "approximately", "around") used in this disclosure can mean the stated value within a range. For example, in certain embodiments, the range can be within (plus or minus) 20%, or within 10%, or within 5%, or within 2%, or within any other suitable percentage or number as appreciated by those having ordinary skill in the art (e.g., for known tolerance limits or error ranges).

The articles "a", "an", and "the" as used herein and in the appended claims are used herein to refer to one or to more than one (i.e., to at least one) of the grammatical object of the article unless the context clearly indicates otherwise. By way of example, "an element" means one element or more than one element.

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e., "one or the other but not both") when preceded by terms of exclusivity, such as "either," "one of," "only one of," or "exactly one of."

Any suitable combination(s) of any disclosed embodiments and/or any suitable portion(s) thereof are contemplated herein as appreciated by those having ordinary skill in the art in view of this disclosure.

The embodiments of the present disclosure, as described above and shown in the drawings, provide for improvement in the art to which they pertain. While the apparatus and methods of the subject disclosure have been shown and described, those skilled in the art will readily appreciate that changes and/or modifications may be made thereto without departing from the scope of the subject disclosure.

What is claimed is:

1. An emergency power unit for an aircraft, comprising:

a fuel cell system configured to generate power using a fuel and an oxidant; and a thermal management system in thermal communication with the fuel cell system to divert heat from the fuel cell system, the thermal management system including:

a heat exchanger disposed in a coolant flow path and configured to receive an expendable coolant from a coolant supply to exchange the heat between the fuel cell system and the expendable coolant in the coolant flow path, wherein the heat exchanger includes a cold plate having a channel defined therein, the channel extending between an inlet and an outlet of the cold plate for passing the expendable coolant in the coolant flow path through the cold plate;

wherein an outlet of the coolant flow path is configured to expel the expendable coolant to ambient.

2. The emergency power unit of claim 1, wherein the coolant supply includes an expendable coolant tank at an inlet of the coolant flow path to provide the expendable coolant directly to the heat exchanger via the coolant flow path.

3. The emergency power unit of claim 2, wherein no other heat exchangers are disposed in the coolant flow path.

4. The emergency power unit of claim 2, wherein the expendable coolant includes a phase change fluid configured to change from a liquid phase to vapor phase upon thermal communication with the heat from the fuel cell system.

5. The emergency power unit of claim 4, wherein the outlet of the coolant flow path is configured to expel the vapor phase of the expendable coolant to ambient.

6. The emergency power unit of claim 4, wherein the phase change fluid includes one of: water, ethanol, methanol, propane, ammonia, or carbon dioxide.

7. The emergency power unit of claim 6, wherein the phase change fluid is free of ram air.

8. An emergency power unit for an aircraft, comprising:

a fuel cell system configured to generate power using a fuel and an oxidant; and a thermal management system in thermal communication with the fuel cell system to divert heat from the fuel cell system, the thermal management system including:

a heat exchanger disposed in a coolant flow path and configured to receive an expendable coolant from a coolant supply through the heat exchanger to exchange the heat between the fuel cell system and the expendable coolant in the coolant flow path, wherein the heat exchanger includes a cold plate having a channel defined therein, the channel extending between an inlet and an outlet of the cold plate for passing the expendable coolant in the coolant flow path through the cold plate, the coolant supply including a coolant tank configured to provide the expendable coolant directly to the heat exchanger via the coolant flow path;

wherein an outlet of the coolant flow path is configured to expel the expendable coolant to ambient.

9. The emergency power unit of claim 8, wherein the heat exchanger is the only heat exchanger in the coolant flow path.

10. The emergency power unit of claim 8, wherein the coolant tank includes a phase change fluid tank and the expendable coolant includes vaporized phase change fluid.

11. The emergency power unit of claim 8, wherein the coolant tank includes a greywater tank and the expendable coolant includes greywater.

12. The emergency power unit of claim 8, wherein:

the heat exchanger is a first heat exchanger;

the expendable coolant is a first coolant;

the coolant flow path is a first coolant flow path; and the thermal management system further includes a second heat exchanger that is (i) disposed in the first coolant flow path and configured to receive the first coolant from the first coolant flow path and (ii) disposed in a second coolant flow path fluidly isolated from the first coolant flow path and configured to receive a second coolant from a second coolant supply to exchange the heat between the first coolant and the second coolant.

13. An emergency power unit for an aircraft, comprising:

a fuel cell system configured to generate power using a fuel and an oxidant; and a thermal management system in thermal communication with the fuel cell system to divert heat from the fuel cell system, the thermal management system including:

a first heat exchanger disposed in a first coolant flow path and configured to receive a first coolant from a first coolant supply through the first heat exchanger to exchange the heat between the fuel cell system and the first coolant in the first coolant flow path, wherein the first heat exchanger includes a cold plate having a channel defined therein, the channel extending between an inlet and an outlet of the cold plate for passing the first coolant through the cold plate; and a second heat exchanger disposed in the first coolant flow path and configured to receive the first coolant from the first coolant flow path and disposed in a second coolant flow path fluidly isolated from the first coolant flow path and configured to receive a second coolant from a second coolant supply through the second heat exchanger to exchange the heat between the first coolant and the second coolant, the second coolant comprising an expendable coolant;

wherein an outlet of the second coolant flow path is configured to expel the expendable coolant to ambient.

14. The emergency power unit of claim 13, wherein the second heat exchanger includes a multi-fluid heat exchanger having (i) a first channel defined therein, the first channel extending between a first inlet and a first outlet of the second heat exchanger for passing the first coolant through the multi-fluid heat exchanger, and (ii) a second channel defined therein, the second channel extending between a second inlet and a second outlet of the second heat exchanger for passing the second coolant through the multi-fluid heat exchanger, wherein the first channel and the second channel are in thermal communication and in fluid isolation with respect to one another.

15. The emergency power unit of claim 14, wherein the first coolant supply includes a refrigerant tank and the first coolant includes refrigerant, and wherein the second coolant supply includes a pressurized air source and the second coolant includes pressurized air.

16. The emergency power unit of claim 15, wherein the first coolant flow path is a coolant loop, wherein the outlet of the second coolant flow path is configured to exhaust the pressurized air to ambient.

17. The emergency power unit of claim 16, wherein the pressurized air source is a cabin air compressor, and wherein the second coolant includes pressurized cabin air.

18. The emergency power unit of claim 14, wherein the first coolant flow path is a coolant loop.

19. The emergency power unit of claim 18, wherein the first coolant supply includes a refrigerant tank and the first coolant includes refrigerant, and wherein the second coolant supply includes a greywater tank and the expendable coolant includes greywater.

20. The emergency power unit of claim 12, wherein the first coolant supply includes a refrigerant tank and the first coolant includes refrigerant.

* * * * *